United States Patent

Soda et al.

[11] Patent Number: 6,124,045
[45] Date of Patent: Sep. 26, 2000

[54] FLUOROPOLYMER COATING COMPOSITION AND COATED ARTICLE

[75] Inventors: Yoshihiro Soda; Nobuyuki Tomihashi, both of Settsu, Japan

[73] Assignee: Daikin Industries, Ltd., Osaka, Japan

[21] Appl. No.: 08/950,317

[22] Filed: Oct. 14, 1997

Related U.S. Application Data

[63] Continuation of application No. 08/666,302, filed as application No. PCT/JP95/02153, Oct. 19, 1995, abandoned.

[30] Foreign Application Priority Data

Nov. 1, 1994 [JP] Japan .................................. 6-269055

[51] Int. Cl.$^7$ ................................ B32B 27/00; C08J 5/00
[52] U.S. Cl. ......................... 428/500; 428/516; 524/376; 524/545; 524/546
[58] Field of Search ..................... 524/376, 545, 524/546; 428/500, 516

[56] References Cited

U.S. PATENT DOCUMENTS

| | | | |
|---|---|---|---|
| 4,914,146 | 4/1990 | Honda et al. | 524/449 |
| 5,198,491 | 3/1993 | Honda et al. | 524/449 |

FOREIGN PATENT DOCUMENTS

| | | |
|---|---|---|
| 0193963 | 10/1986 | European Pat. Off. . |
| 49-009084 | 4/1974 | Japan . |
| 52-050323 | 4/1977 | Japan . |
| 2-068126 | 3/1990 | Japan . |
| 2-222439 | 9/1990 | Japan . |
| 4-018934 | 6/1992 | Japan . |
| 93-191637 | 5/1993 | Japan . |
| 5-339537 | 12/1993 | Japan . |
| 1329049 | 9/1973 | United Kingdom . |

OTHER PUBLICATIONS

Supplementary European Search Report EP 95 93 4850 mailed Sep. 9, 1998; cited reference XP–002073991.

*Primary Examiner*—Peter D. Mulcahy
*Attorney, Agent, or Firm*—Varndell & Varndell, PLLC

[57] ABSTRACT

The present invention provides a fluoropolymer coating composition which comprises fine particles of a fluoropolymer, 0.1 to 300% by weight of a polyether type high molecular surfactant on the basis of a weight of the above-mentioned fine particles and a liquid carrier and is capable of coating thick and forming a coating film being excellent in abrasion resistance, corrosion resistance and non-sticking property, and provides a coated article obtained by coating the above-mentioned composition as a top coat.

17 Claims, No Drawings

FLUOROPOLYMER COATING COMPOSITION AND COATED ARTICLE

CROSS-REFERENCE TO RELATED APPLICATIONS

This application is a continuation application of U.S. Ser. No. 08/666,302 filed Jun. 27, 1996, now abandoned, which is a U.S. national phase application based on International Application No. PCT/JP95/02153, filed Oct. 19, 1995.

TECHNICAL FIELD

The present invention relates to a fluoropolymer coating composition and a coated article.

BACKGROUND ART

An anionic surfactant has been hitherto added, as an auxiliary for forming a film, to a fluoropolymer coating composition. However there were drawbacks such that since foaming is apt to occur, pin holes are easy to be produced and that, since film forming property is insufficient and thick coating is difficult, corrosion resistance and non-sticking property are lowered due to abrasion of a coating film.

An object of the present invention is to provide the fluoropolymer coating composition which incorporates a specific polyether type high molecular surfactant and is capable of coating thick and forming a coating film excellent in abrasion resistance, corrosion resistance and non-sticking property, and to provide the article coated with that fluoropolymer coating composition.

DISCLOSURE OF THE INVENTION

The present invention relates to the fluoropolymer coating composition which comprises fine particles of a fluoropolymer, 0.1 to 300% by weight of the specific polyether type high molecular surfactant on the basis of a weight of the above-mentioned fine particles, and a liquid carrier.

Also the present invention relates to the article coated with the above-mentioned fluoropolymer coating composition as a top coat so as to form at least 30 µm thick molten coating film.

BEST MODE FOR CARRYING OUT THE INVENTION

The fluoropolymer of the present invention is one of homopolymers of monoethylenically unsaturated hydrocarbon monomer being completely substituted by fluorine, chlorine or those two atoms, copolymers of at least two of the above-mentioned monomers or mixtures comprising at least two of the homopolymers and the copolymers.

Example of the above-mentioned homopolymers is polytetrafluoroethylene (PTFE).

Examples of the above-mentioned copolymers are, for instance, a tetrafluoroethylene-perfluoro(alkyl vinyl ether) copolymer (PFA) (the number of carbon atoms of the alkyl group is from 1 to 5) and tetrafluoroethylene-hexafluoropropylene (FEP) copolymer, and PFA is preferable in view of its excellent non-sticking property and heat resistance.

Examples of the above-mentioned mixtures of the homopolymers and the copolymers are, for instance, a mixture of PTFE and PFA, a mixture of PTFE and FEP, a mixture of PTFE, PFA and FEP, a mixture of PFA and FEP and the like, and the mixture of PTFE and PFA is preferable in view of its excellent non-sticking property and heat resistance.

A number average molecular weight of the above-mentioned fluoropolymer is from $2\times10^4$ to $1\times10^7$, and $2\times10^5$ to $8\times10^6$ is preferable. When the number average molecular weight is less than $2\times10^4$, the coating film tends to become fragile, and when more than $1\times10^7$, there is a tendency that the particles are not fused with each other because its melt viscosity is too high.

The number average molecular weight of PTFE can be obtained, for example, through the measuring method described in Vol. 17, pages 3,253 to 3,257 of "Journal of Applied Polymer Science" (1973).

Also the number average molecular weight of FEP can be obtained through the method described in ASTM D-2116 by measuring a melt flow rate (MFR), calculating a melt viscosity based on the equation (1) and then calculating the number average molecular weight (MW) based on the equation (2).

$$MV = \frac{\pi \times \text{Applied pressure (kgf/mm}^2) \times \text{Radius of orifice (mm)}}{8 \times MFR \times \text{Length of orifice (mm)}} \quad \text{Equation (1):}$$

$$MW = 3.4\sqrt{\frac{MV}{162\times10^{-13}}} \quad \text{Equation (2):}$$

The above-mentioned fine particles of the fluoropolymer may be fine particles being obtained, for example, through emulsion polymerization or the like of fluoroolefin, and the average particle size thereof is from 0.01 to 100 µm, and 0.1 to 5 µm is preferable. When the particle size is less than 0.01 µm, a film forming property tends to be lowered, and when more than 100 µm, a gun nozzle used for coating tends to be plugged.

Also in the present invention, there can be used an aqueous dispersion of the fine particles of the fluoropolymer obtained through the above-mentioned emulsion polymerization or fine particles in the form of a powder which are obtained from the above-mentioned aqueous dispersion. From the viewpoint of stability of the emulsion, which is affected by electrical repulsion of the particles, it is preferable to use in the form of the aqueous dispersion, and from the viewpoint of the film forming, its solid concentration is from 20 to 80% by weight, preferably from 40 to 70% by weight.

Examples of the specific polyether type high molecular surfactant used in the present invention is one represented by the formula (I):

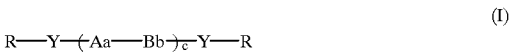
(I)

wherein R is hydrogen or an alkyl having 1 to 20 carbon atoms, Y is ether, ester, urethane, thionyl or phosphoric acid residual group, A is ethylene oxide residual group, B is propylene oxide residual group, a is an integer of 30 to 2,000, b is an integer of 20 to 500, c is an integer of 1 to 10 (in the parenthesis is represented a residual group obtained through alternating copolymerization or random copolymerization), the formula (II):

R-Y-Aa-Bb-Ad-Y-R (II)

wherein R, Y, A, B and b are the same as above, the sum of a and d is an integer of 30 to 2,000, the formula (III):

R-Y-Ba-Ab-Bd-Y-R                                          (III)

wherein R, Y, A and B are the same as above, the sum of a and d is an integer of 20 to 500, b is an integer of 30 to 2,000, or a mixture of at least two thereof.

The specific polyether type high molecular surfactant used in the present invention is also one represented by the formula (IV):

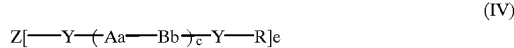

Z[—Y—(Aa—Bb)c—Y—R]e                                      (IV)

wherein Z is a polyvalent aliphatic saturated hydrocarbon residual group having 1 to 5 carbon atoms, R is hydrogen or an alkyl having 1 to 20 carbon atoms, Y is ether, ester, urethane, thionyl or phosphoric acid residual group, A is ethylene oxide residual group, B is propylene oxide residual group, a is an integer of 30 to 2,000, b is an integer of 20 to 500, c is an integer of 1 to 10, e is an integer of 1 to 4 (in the parenthesis is represented a residual group obtained through alternating copolymerization or random copolymerization),
the formula (V):

Z[-Y-Aa-Bb-Ad-Y-R]e                                       (V)

wherein Z, R, Y, A, B and b are the same as above, the sum of a and d is an integer of 30 to 2,000, e is an integer of 1 to 4,
the formula (VI):

Z[-Y-Ba-Ab-Bd-Y-R]e                                       (VI)

wherein Z, R, Y, A and B are the same as above, the sum of a and d is an integer of 20 to 500, b is an integer of 30 to 2,000, e is an integer of 1 to 4,
or a mixture of at least two thereof.

In the formula (I), when R is the alkyl, the number of its carbon atoms is preferably from 1 to 18 in view of thermal decomposition property. It is preferable that Y is the ether or ester residual group in view of the thermal decomposition property. It is preferable that a is an integer of 40 to 600 in view of the film forming property and the thermal decomposition property, and that b is an integer of 30 to 120 from the viewpoint of thickening property. In view of leveling property, c is preferably 1 to 5.

In the formula (II), when R is the alkyl, the number of its carbon atoms is preferably from 1 to 18 in view of the thermal decomposition property. It is preferable that Y is the ether or ester residual group in view of the thermal decomposition property. It is preferable that a is an integer of 20 to 300 in view of the film forming property and the thermal decomposition property, and that b is an integer of 30 to 120 from the viewpoint of the thickening property. In view of the film forming property and the thermal decomposition property, d is preferably an integer of 20 to 300.

In the formula (III), when R is the alkyl, the number of its carbon atoms is preferably from 1 to 18 in view of the thermal decomposition property. It is preferable that Y is the ether or ester residual group in view of the thermal decomposition property. It is preferable that a is an integer of 15 to 60 in view of the thickening property and the thermal decomposition property, and that b is an integer of 40 to 600 from the viewpoint of the film forming property. In view of the thickening property and the thermal decomposition property, d is preferably an integer of 15 to 60.

In the formula (IV), it is preferable that the number of carbon atoms of Z is 2 or 3 in view of the thickening property and the thermal decomposition property, and that when R is the alkyl, the number of its carbon atoms is from 1 to 18 in view of the thickening property and the thermal decomposition property. Y is preferably the ether or ester residual group from the viewpoint of the thermal decomposition property. It is preferable that a is an integer of 40 to 600 in view of the film forming property and the thermal decomposition property, b is an integer of 30 to 120 in view of the thickening property, c is from 1 to 5 in view of the leveling property and e is 1 from a point that the decomposition property is good when the coating is baked.

In the formula (V), it is preferable that the number of carbon atoms of Z is 2 or 3 in view of the thickening property and the thermal decomposition property, and that when R is the alkyl, the number of its carbon atoms is from 1 to 18 in view of the thermal decomposition property. Y is preferably the ether or ester residual group from the viewpoint of the thermal decomposition property. It is preferable that a is an integer of 20 to 300 in view of the film forming property and the thermal decomposition property, b is an integer of 30 to 120 in view of the thickening property, d is from 20 to 300 in view of the film forming property and the thermal decomposition property and e is 1 from a point that the decomposition property is good when the coating is baked.

In the formula (VI), it is preferable that the number of carbon atoms of Z is 2 or 3 in view of the thickening property and the thermal decomposition property, and that when R is the alkyl, the number of its carbon atoms is from 1 to 18 in view of the thermal decomposition property. Y is preferably the ether or ester residual group from the viewpoint of the thermal decomposition property. It is preferable that a is an integer of 15 to 60 in view of the thickening property and the thermal decomposition property, b is an integer of 40 to 600 in view of the film forming property, d is from 15 to 60 in view of the thickening property and the thermal decomposition property and e is 1 from a point that the decomposition property is good when the coating is baked.

The above-mentioned specific polyether type high molecular surfactant has the thickening and film forming functions, and is, for example, a high molecular surfactant having a lipophilic portion at the propylene glycol moiety and a hydrophilic portion at the ethylene glycol moiety. The surfactant is decomposed and vaporized in a temperature range from around 250° C. to a melting temperature of the above-mentioned fluoropolymer, and is capable of being in the form of an alternating copolymer (for example, in case of a=b=1 in the formula (I) or (IV)), a block copolymer (for example, the formula (II), (III), (V) or (VI)), a random copolymer (for example, the formula (I) or (IV)) and the like. From the viewpoint of easiness of the thickening, at least one block copolymer represented by the formula (II) is most preferable.

The weight average molecular weight of the ethylene glycol moiety of those specific polyether type high molecular surfactants is from $1\times10^3$ to $2\times10^5$, preferably from $2\times10^3$ to $2\times10^4$, more preferably from $8\times10^3$ to $8\times10^4$, and the weight average molecular weight of the propylene glycol moiety is from $1\times10^2$ to $3\times10^4$, preferably from $1\times10^3$ to $3\times10^4$, more preferably from $2\times10^3$ to $1\times10^4$.

When the weight average molecular weight of the above-mentioned ethylene glycol moiety is less than $1\times10^3$, there is a tendency that phase separation occurs and thus uniform dispersion is not obtained. When more than $2\times10^5$, there is a tendency that the dispersion is thickened too much, which makes spraying impossible. When the weight average molecular weight of the above-mentioned propylene glycol moiety is less than $1\times10^2$, there is a tendency that running or dropping of a coating is apt to occur due to insufficient thickening and cracks occur on the dropped portion of the coating at the time of baking. When more than $3\times10^4$, there is a tendency that the dispersion is thickened too much, which makes spraying impossible.

Examples of the formula (I) are, for instance, a random polymer represented by $$HO(CH_2CH_2O)_a(CH(CH_3)CH_2O)_bH \qquad (1)$$

wherein a is 300, b is 75, a random polymer represented by $$C_{17}H_{35}COO(CH_2CH_2O)_a(CH(CH_3)CH_2O)_bCOC_{17}H_{35} \qquad (2)$$

wherein a is 300, b is 75 and the like, and the structure (1) is preferable in view of the thermal decomposition property.

Examples of the formula (II) are, for instance, block polymers represented by;

$$HO(CH_2CH_2O)_a(CH(CH_3)CH_2O)_b(CH_2CH_2O)_dH \qquad (3)$$

wherein the sum of a and d is 364, b is 69,

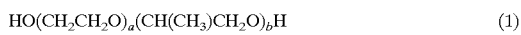(4)

wherein the sum of a and d is 300, b is 60, and the like, and the structure (3) is preferable in view of the thermal decomposition property.

Examples of the formula (III) are, for instance, block polymers represented by;

$$HO(CH(CH_3)CH_2O)_a(CH_2CH_2O)_b(CH(CH_3)CH_2O)_dH \qquad (5)$$

wherein the sum of a and d is 64, b is 350,

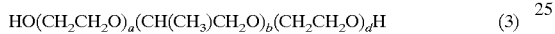(6)

wherein the sum of a and d is 60, b is 310, and the like, and the structure (5) is preferable in view of the thermal decomposition property.

Examples of the formula (IV) are, for instance, (7) a random polymer represented by;

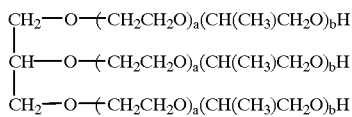

wherein a is 300, b is 75,
(8) a random polymer represented by;

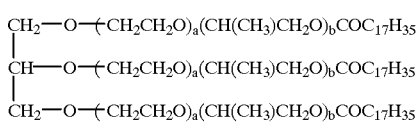

wherein a is 300, b is 75, and the like, and the structure (7) is preferable in view of the thermal decomposition property.

Examples of the formula (V) are, for instance, block polymers represented by;

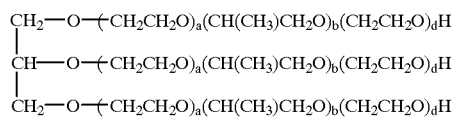(9)

wherein the sum of a and d is 364, b is 69,

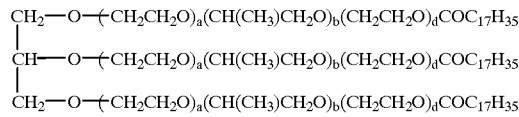(10)

wherein the sum of a and d is 300, b is 60, and the like, and the structure (9) is preferable in view of the thermal decomposition property.

Examples of the formula (VI) are, for instance, block polymers represented by;

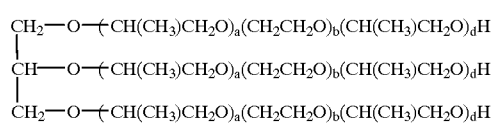(11)

wherein the sum of a and d is 64, b is 350,

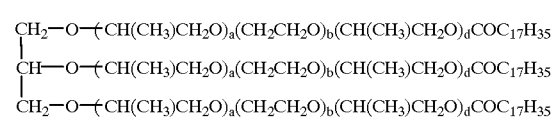(12)

wherein the sum of a and d is 60, b is 310, and the like, and the structure (11) is preferable in view of the thermal decomposition property.

In the present invention, in case where the high molecular surfactant represented by the formula (I), (II) or (III) is solely used, the formula (II) is preferable in view of easiness of the thickening, and in case where at least two surfactants are used, for example, all combinations of the formulae (I) to (III) are possible and a combination of (I) and (II) is preferable from a point that the leveling property is given by thickening. In that case, the preferred combination of the above-mentioned examples is, for instance, (1) and (3) or (4), (2) and (3) or (4) or the like in view of the thermal decomposition property.

Also in the present invention, in case where the high molecular surfactant represented by the formula (IV), (V) or (VI) is solely used, the formula (V) is preferable in view of easiness of the thickening, and in case where at least two surfactants are used, for example, all combinations of the formulae (IV) to (VI) are possible and a combination of (IV) and (V) is preferable from a point that the leveling property is given by thickening. In that case, the preferred combination of the above-mentioned examples is, for instance, (7) and (9) or (10), (8) and (9) or (10) or the like in view of the thermal decomposition property.

Examples of the liquid carrier in the present invention are, for instance, water; a mixture of water with an alcohol such as methyl alcohol, ethyl alcohol, propyl alcohol or isopropyl alcohol, a polyhydric alcohol such as ethylene glycol, diethylene glycol, triethylene glycol or glycerin, a ketone such as acetone, an amine such as diethylamine, triethylamine, ethanolamine, diethanolamine or triethanolamine, an ether such as tetrahydrofuran, or the like. Among them, water and a mixture of water with diethanolamine are preferable to prevent coagulation of fluorine-containing particles and from the viewpoint of the film forming property.

Further in the present invention, for example, nonpolar solvent such as toluene, xylene or an aromatic hydrocarbon having 9 to 11 carbon atoms can be used as the liquid carrier in such an amount as not impairing physical properties of the composition, for example, in an amount of not more than 15% (% by weight, hereinafter the same) in the composition.

In the present invention, a filler such as mica particles, mica particles coated with pigment, metal flakes or a mixture of at least two thereof can be added. Those fillers have a function of enhancing abrasion resistance, and from a point of giving a good appearance to a coating film, mica is preferable.

The size of the mica particles is from 10 to 100 $\mu$m, preferably from 15 to 50 $\mu$m. When the particle size is less than 10 $\mu$m, the abrasion resistance of the coating film tends to be lowered, and when more than 100 $\mu$m, the non-sticking property tends to be lowered.

The mica particles coated with pigment are ones prepared by coating the above-mentioned mica particles with a pigment, for example, $TiO_2$, $Fe_2O_3$ or the like through vapor-deposition and sintering method.

Examples of the metal flakes are, for instance, titanium, zirconium, aluminum, zinc, antimony, tin, iron, nickel and the like. From a point of difficulty of rust, titanium and zirconium are preferable, and their size is from 10 to 100 $\mu$m, more preferably from 15 to 50 $\mu$m. When less than 10 $\mu$m, the abrasion resistance of the coating film tends to become worse, and when more than 100 $\mu$m, the non-sticking property tends to be lowered.

In the present invention, there can be used various additives, for example, a drying agent such as cobalt oxide; a defoaming agent such as silicone oil; a thickener such as methyl cellulose, PVA and carboxylated vinyl polymer; a leveling agent such as an aromatic hydrocabon having 9 to 11 carbon atoms or a glycol type solvent; a pigment such as titanium oxide, red oxide or carbon black; and the like. Those additives may be added through usual method. The amount of addition thereof is not more than 50%, preferably not more than 35% on the basis of a weight of the above-mentioned fluoropolymer. When more than 50%, the non-sticking property tends to be lost.

The amount of the above-mentioned specific polyether type high molecular surfactant is from 0.1 to 300%, preferably from 0.5 to 100%, more preferably from 1 to 30% on the basis of a weight of the fine particles of the above-mentioned fluoropolymer. When less than 0.1%, there is no effect of the addition, and when more than 300%, the coating film cannot be formed.

The amount of the above-mentioned filler is from 0.2 to 20%, preferably from 1 to 15%, more preferably from 2 to 10% on the basis of the total weight of the filler and the FIFE polymer. When less than 0.2%, the abrasion resistance of the coating film tends to become worse, and when more than 20%, the non-sticking property tends to be lowered.

The solid concentration of the fluoropolymer coating composition of the present invention is from 20 to 80%, preferably from 40 to 70%. When the concentration is less than 20%, the coating film tends not to be formed, and when more than 80%, there is a tendency that spraying cannot be conducted.

In order to prepare the fluoropolymer coating composition of the present invention, there is, for example, the following method.

A vessel equipped with a stirrer is charged with 90 to 110 parts (part by weight, hereinafter the same) of the aqueous dispersion of the fluoropolymer fine particles, and with stirring, thereto are added in turn 2 to 10 parts of the filler, 3 to 500 parts of the aqueous solution containing 15 to 30% by weight of the specific polyether type high molecular surfactant, 2 to 22 parts of the liquid carrier and if necessary, 0.05 to 10 parts of the additive. The obtained mixture is stirred at 5° to 30° C. for 10 to 40 minutes until a uniform dispersion is obtained. Then the fluoropolymer coating composition of the present invention can be prepared.

The composition of the present invention may be applied to various substrates through usual methods. For example, after sand-blasting a surface of metal, enamel, glass, ceramic or the like to be made rough, the substrate is undercoated with a primer mixture (Polyflon TFE Enamel EK-1909BKN available from Daikin Industries, Ltd.) and then coating is carried out by dipping in the composition, spraying or coating by means of a roller or a doctor blade. Further the coated substrate is subjected to baking for 10 to 30 minutes at a temperature (340° to 415° C.) enough for the fluoropolymer in the coated composition to be melted.

The thickness of the molten coating film is not less than 30 $\mu$m. Though there is particularly no upper limit of the thickness, when more than 70 $\mu$m, a sludge of the polyether type high molecular surfactant remains in the coating film and the non-sticking property is suddenly lowered. It is preferable, therefore, that the thickness is from 30 to 70 $\mu$m.

The composition of the present invention is most useful, for example, for coating on metal cooking tools, particularly a frying pan, and can also be used for coating on the other products requiring corrosion resistance. Examples of these products are, for instance, those made of glass or materials resistant to the baking temperature thereof, such as bearing, valve, wire, metal foil, boiler, pipe, ship bottom, inner lining of electric oven, bottom plate of iron, bread baking mold, rice-cooker, grill pan, electric pot, ice-making tray, snow shovel, plow, chute, conveyor, roll, metal die, dice, a tool such as saw, file or drill, cooking knife, hopper, and in addition, container and molding die for industrial use.

The present invention is then explained by means of Examples, but is not limited thereto.

EXAMPLE 1

The following components were mixed in the order described below.

| | | |
|---|---|---|
| (1) | Aqueous PTFE dispersion (Polyflon TFE Dispersion D-1 available from Daikin Industries, Ltd., aqueous dispersion containing 60% solids (containing polyoxyethylene alkyl phenol ether (EO = 10) as a dispersing stabilizer in an amount of 6% on the basis of PTFE)) | 240.0 parts |
| (2) | Mica particles (particle size 30 $\mu$m) coated with $TiO_2$ | 14.4 parts |
| (3) | Oxyethylene-oxypropylene block copolymer (25% aqueous solution of Newpole PE 128 available from Sanyo Kasei Kogyo Kabushiki Kaisha (corresponding to the above-mentioned formula (II), R is H, Y is oxygen, a is 182, b is 69, d is 182)) | 57.6 parts |
| (4) | Triethanolamine | 7.2 parts |

Tests were carried out with respect to physical properties of the obtained coating composition.

The tests were conducted in the following manner.

Physical properties of coating composition

Viscosity: Measured by using a model B rotational viscometer (No. 2 rotor) and rotating it at a rate of 60 rpm for two minutes (temperature: 25° C.).

pH: Measured with a pH meter through normal method.

Solid content: An amount of 10 g of the coating composition was measured in an aluminum cup, and after baking at 380° C. for 45 minutes, a weight of solid content was measured.

The results are shown in TABLE 1.

Subsequently, on an aluminum frying pan subjected to sand-blasting and undercoating of a primer mixture (Polyflon TFE Enamel EK-1909BKN (containing polyamideimide) available from Daikin Industries, Ltd.) so that its thickness after drying became 15 μm was spray-coated the composition of the present invention prepared by mixing the above-mentioned components (1) to (4) in such an amount that its thickness after baking became 35 μm, followed by baking at 380° C. for 15 minutes, to give the aluminum frying pan having a total coating thickness of 50 μm including a top coat of the composition of the present invention. With respect to physical properties of the coating film, the following tests were carried out.

Physical properties of coating film

Critical coating thickness at cracking:

Non-blasted aluminum plate was spray-coated with the coating composition, and was subjected to baking under the above-mentioned baking conditions. The measurement was made with an electromagnetic thickness meter.

Pencil hardness:

Tested in accordance with JIS K 5400-Testing Methods for Organic Coatings.

Spiral scoring test:

Tested in accordance with JIS K 5400-Testing Methods for Organic Coatings.

Taper-abrasion resistance test:

Tested in accordance with JIS K 5400-Testing Methods for Organic Coatings.

Boiling water resistance test:

Tested in accordance with JIS K 5400-Testing Methods for Organic Coatings. When the coating was not peeled off, it was evaluated as "Good", and when the coating was peeled off, it was evaluated as "Blistering occurred".

Salt water spray test:

Tested in accordance with JIS K 5400-Testing Methods for Organic Coatings. When the coating was not peeled off, it was evaluated as "Good", and when the coating was peeled off, it was evaluated as "Blistering occurred".

Non-stickiness test:

A stainless mesh of 2 mm$^2$ measure was fit to a PTFE vessel (inside diameter 3.5 cm, outside diameter 4.8 cm, thickness 1.5 cm), and a mixture of 20 g of flour, 10 g of sugar and 40 g of water was poured into the vessel. The vessel was placed on the coated surface and heated at 200° C. for six minutes. Then the vessel was pulled up by using a spring balance to measure adhering force per unit area The results are shown in TABLE 1.

EXAMPLE 2

The composition of the present invention and the article coated therewith were prepared in the same manner as in EXAMPLE 1 except that the following kind of oxyethylene-oxypropylene block copolymer was used in an amount shown in TABLE 1, and the tests were carried out in the same manner as in EXAMPLE 1.

Oxyethylene-oxypropylene block copolymer: 25% aqueous solution of Newpole V-10-C available from Sanyo Kasei Kogyo Kabushiki Kaisha (corresponding to the above-mentioned formula (V), R is H, Y is oxygen, a is 182, b is 69, d is 182, Z is a trivalent aliphatic saturated hydrocarbon, e is 3).

The results are shown in TABLE 1.

EXAMPLE 3

The composition of the present invention and the article coated therewith were prepared in the same manner as in EXAMPLE 1 except that the following kind of oxyethylene-oxypropylene random copolymer was used in an amount shown in TABLE 1 instead of the oxyethylene-oxypropylene block copolymer, and the tests were carried out in the same manner as in EXAMPLE 1.

Oxyethylene-oxypropylene random copolymer: 25% aqueous solution of Newpole 75H-90000 available from Sanyo Kasei Kogyo Kabushiki Kaisha (corresponding to the above-mentioned formula (I), R is H, Y is oxygen, a is 300, b is 75, c is 1).

The results are shown in TABLE 1.

EXAMPLE 4

The following components were mixed in the order described below.

| | |
|---|---:|
| (1) Aqueous PTFE dispersion (Polyflon TFE Dispersion D-1 available from Daikin Industries, Ltd., aqueous dispersion containing 60% solids (containing polyoxyethylene alkyl phenol ether (EO = 10) as a dispersion stabilizer in an amount of 6% on the basis of PTFE)) | 240.0 parts |
| (2) Mica particles (particle size 30 μm) coated with TiO$_2$ | 14.4 parts |
| (3) Mill base (a mixture prepared by mixing a mixture of 55 parts of deionized water and 45 parts of cobalt blue oxide in a ball mill) | 7.2 parts |
| (4) Oxyethylene-oxypropylene block copolymer (25% aqueous solution of Newpole PE 128 available from Sanyo Kasei Kogyo Kabushiki Kaisha (corresponding to the above-mentioned formula (II), R is H, Y is oxygen, a is 182, b is 69, d is 182)) | 57.6 parts |
| (5) Triethanolamine | 7.2 parts |

Tests were carried out with respect to physical properties of the obtained compositions in the same manner as in EXAMPLE 1.

The results are shown in TABLE 1.

Also a coated article was obtained in the same manner as in EXAMPLE 1 except that a thickness of the composition of the present invention after drying was 45 μm. The results are shown in TABLE 1.

COMPARATIVE EXAMPLE 1

A composition and an article coated therewith were obtained in the same manner as in EXAMPLE 1 except that no oxyethylene-oxypropylene block copolymer was used and that a thickness of the composition as a top coat after drying was 10 μm (total thickness of the coating film: 25 μm). The tests were carried out in the same manner as in EXAMPLE 1, and the results are shown in TABLE 1.

COMPARATIVE EXAMPLE 2

The following components were mixed in the order described below.

| | |
|---|---|
| (1) Aqueous PTFE dispersion (Polyflon TFE Dispersion D-1 available from Daikin Industries, Ltd, aqueous dispersion containing 60% of solids (containing polyoxyethylene alkyl phenol ether (EO = 10) as a dispersion stabilizer in an amount of 6% on the basis of PTFE)) | 240.0 parts |
| (2) Deionized water | 29.1 parts |
| (3) Mixed solution of 17.1 parts of anionic surfactant (sodium lauryl sulfate) and 5.7 parts of toluene | 22.8 parts |

Tests were carried out with respect to the obtained composition in the same manner as in EXAMPLE 1.

The results are shown in TABLE 1.

Also a coated article was obtained in the same manner as in EXAMPLE 1 except that a composition comprising the above-mentioned components (1) to (3) was used instead of the composition of the present invention and that a thickness of the coating film as a top coat after drying was 15 μm (total thickness of the coating film: 30 μm), and the test were carried out in the same manner as in EXAMPLE 1. The results are shown in TABLE 1.

COMPARATIVE EXAMPLE 3

The following components were mixed in the order described below.

| | |
|---|---|
| (1) Aqueous PTFE dispersion (Polyflon TFE Dispersion D-1 available from Daikin Industries, Ltd., aqueous dispersion containing 60% of solids (containing polyoxyethylene alkyl phenol ether (EO = 10) as a dispersion stabilizer in an amount of 6% on the basis of PTFE)) | 240.0 parts |
| (2) Deionized water | 29.1 parts |
| (3) Mill base (a mixture prepared by mixing a mixture of 55 parts of deionized water and 45 parts of cobalt blue oxide in a ball mill) | 7.2 parts |
| (4) Mixed solution of 17.1 parts of anionic surfactant (sodium lauryl sulfate) and 5.7 parts of toluene | 22.8 parts |

Tests were carried out with respect to the obtained composition in the same manner as in EXAMPLE 1.

The results are shown in TABLE 1.

A coated article was obtained in the same manner as in EXAMPLE 1 except that a composition comprising the above-mentioned components (1) to (4) was used instead of the composition of the present invention and that a thickness of the coating film as a top coat after drying was 20 μm (total thickness of the coating film 35 μm), and tests were carried out in the same manner as in EXAMPLE 1. The results are shown in TABLE 1.

TABLE 1

| | Ex. 1 | Ex. 2 | Ex. 3 | Ex. 4 | Com. Ex. 1 | Com. Ex. 2 | Com. Ex. 3 |
|---|---|---|---|---|---|---|---|
| Mixing amount (part) | | | | | | | |
| Aqueous PTFE dispersion | 100 | 100 | 100 | 100 | 100 | 100 | 100 |
| Oxyethylene-oxypropylene block copolymer (corresponding to the formula (II)) | 6 | — | — | 6 | — | — | — |
| Oxyethylene-oxypropylene block copolymer (corresponding to the formula (V)) | — | 6 | — | — | — | — | — |
| Oxyethylene-oxypropylene random copolymer (corresponding to the formula (I)) | — | — | 8 | — | — | — | — |
| Anionic surfactant | — | — | — | — | — | 9 | 9 |
| Mica particles coated with TiO$_2$ | — | — | — | 6 | — | — | — |
| Physical properties of coating composition | | | | | | | |
| Viscosity (cp) | 180 | 190 | 140 | 160 | 23 | 180 | 140 |
| pH | 9 | 9 | 9 | 9 | 9 | 9 | 9 |
| Solid content (%) | 47 | 47 | 47 | 50 | 60 | 46 | 49 |
| Physical properties of coating film | | | | | | | |
| Critical coating thickness at cracking (μm) | 45 | 50 | 47 | 70 | 15 | 21 | 30 |
| Pencil hardness | | | | | | | |
| room temp. | H | H | H | 2H | 2B | H | 2H |
| 200° C. | HB | HB | HB | H | not more than 6B | B | H |
| Spiral scoring test | 4.5 | 4.5 | 4.5 | 5 | 1 | 4.5 | 4.5 |
| Taper-abrasion resistance test (mg/1000 times) | 14 | 14 | 15 | 10 | 25 | 24 | 19 |
| Boiling water resistance test 100 hrs. | Good | Good | Good | Good | Blistering occurred | Good | Blistering occurred |
| Salt water spray test 100 hrs. | Good | Good | Good | Good | Blistering occurred | Blistering occurred | Blistering occurred |
| Non-stickiness test (g/cm$^2$) | 12 | 12 | 12 | 14 | 20 | 13 | 16 |

As is clear from TABLE 1, it can be seen that the composition (EXAMPLE 1) of the present invention, to which the specific polyether type high molecular surfactant represented by the formula (II) is incorporated, is excellent in the critical coating thickness at cracking, pencil hardness at 200° C., taper-abrasion resistance, resistance in boiling water and salt water spraying tests and non-sticking property.

Also it can be seen that the composition (EXAMPLE 2) of the present invention, to which the specific polyether type high molecular surfactant represented by the formula (III) is incorporated, is excellent in the critical coating thickness at cracking, pencil hardness at 200° C., taper-abrasion resistance, resistance in boiling water and salt water spraying tests and non-sticking property.

Also it can be seen that the composition (EXAMPLE 3) of the present invention, to which the specific polyether type high molecular surfactant represented by the formula (I) is incorporated, is excellent in the critical coating thickness at cracking, pencil hardness at 200° C., taper-abrasion resistance, resistance in boiling water and salt water spraying tests and non-sticking property.

Further it can be seen that the composition (EXAMPLE 4) of the present invention, to which the specific polyether type high molecular surfactant represented by the formula (II) and mica particles coated with $TiO_2$ are incorporated, is more excellent in critical coating thickness at cracking, pencil hardness and taper-abrasion resistance.

INDUSTRIAL APPLICABILITY

As it is clear from the above-mentioned results, the fluoropolymer coating composition of the present invention is capable of coating thick, forming a coating film excellent in abrasion resistance, corrosion resistance and non-sticking property, and the article coated with the above-mentioned composition as a top coat assures that its qualities can be maintained for a long period of time.

We claim:

1. A fluoropolymer coating composition comprising fine particles of a fluoropolymer, 0.1 to 300% by weight of a polyether high molecular surfactant on the basis of a weight of said fine particles, and a liquid carrier; said surfactant is one or more members selected from the group consisting of:

formula (IV):

 (IV)

wherein Z is polyvalent aliphatic saturated hydrocarbon residual having 1 to 5 carbon atoms, R is hydrogen or an alkyl having 1 to 20 carbon atoms, Y is ether, ester, urethane, thionyl or phosphoric acid residual group, A is ethylene oxide residual group, B is propylene oxide residual group, a is an integer of 40 to 600, b is an integer of 30 to 120, c is an integer of 1 to 10, e is an integer of 1 to 4, and Aa-Bb is a residual group obtained through alternating copolymerization or random copolymerization, formula (V):

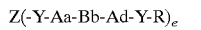 (V)

wherein Z, R, Y, A, B and b are the same as above, and the sum of a and d is an integer of 30 to 2,000, e is an integer of 1 to 4, and formula (VI):

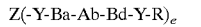 (VI)

wherein Z, R, Y, A and B are the same as above, the sum of a and d is an integer of 30 to 2,000, b is an integer of 30 to 2,000, and e is an integer of 1 to 4.

2. A fluoropolymer coating composition comprising fine particles of a fluoropolymer, 0.1 to 300% by weight of a polyether high molecular surfactant on the basis of a weight of said fine particles, and a liquid carrier; said surfactant is one or more members selected from the group consisting of formula (I):

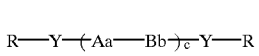 (I)

wherein R is hydrogen or an alkyl group having 1 to 20 carbon atoms, Y is ether, ester, urethane, thionyl or phosphoric acid residual group, A is ethylene oxide residual group, B is propylene oxide residual group, a is an integer of 40 to 600, b is an integer of 30 to 120, c is an integer of 1 to 10, and Aa-Bb is a residual group obtained through alternating copolymerization or random copolymerization, formula (II):

 (II)

wherein R, Y, A and B are the same as above, and b is an integer of 69 to 500, and the sum of a and d is an integer of 30 to 2,000, and formula (III):

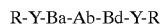 (III)

wherein R, Y, A and B are the same as above, the sum of a and d is an integer of 30 to 2,000, and b is an integer of 30 to 2,000.

3. The fluoropolymer coating composition of claim 2, wherein said fluoropolymer is a tetrafluoroethylene polymer.

4. The fluoropolymer coating composition of claim 3, wherein the tetrafluoroethylene polymer is polytetrafluoroethylene, tetrafluoroethylene-perfluoro(alkyl vinyl ether) copolymer, tetrafluoroethylene-hexafluoropropylene copolymer or at least two thereof.

5. A fluoropolymer coating composition prepared by adding, to the fluoropolymer coating composition of claim 2,
   (1) mica particles, mica particles coated with pigment, metal flakes or a mixture of at least two thereof, and the fluoropolymer comprises
   (2) polytetrafluoroethylene, tetrafluoroethylene-perfluoro (alkyl vinyl ether) copolymer, tetrafluoroethylene-hexafluoropropylene copolymer or a mixture of at least two thereof, wherein an amount of the component (2) is 80 to 99.8% by weight and an amount of the component (1) is 20 to 0.2% by weight on the basis of the sum of components (1) and (2).

6. The fluoropolymer coating composition of claim 2, wherein said liquid carrier is water.

7. A coated article which is obtained by coating, as a top coat, the fluoropolymer coating composition of claim 2 so as to form at least 30 µm thick molten coating film.

8. The fluoropolymer coating composition of claim 1, wherein said fluoropolymer is a tetrafluoroethylene polymer.

9. A fluoropolymer coating composition prepared by adding, to the fluoropolymer coating composition of claim 1, (1) mica particles, mica particles coated with pigment, metal flakes or a mixture of at least two thereof, and the fluoropolymer comprises (2) polytetrafluoroethylene, tetrafluoroethylene-perfluoro (alkyl vinyl ether) copolymer, tetrafluoroethylene-hexaflouropropylene copolymer or a mixture of at least two thereof, wherein an amount of the component (2) is 80 to 99.8% % by weight and an amount of the component (1) is 20 to 0.2% by weight on the basis of the sum of components (1) and (2).

10. The fluoropolymer coating composition of claim 1, where said liquid carrier is water.

11. The fluoropolymer coating composition of claim 3, where said liquid carrier is water.

12. The fluoropolymer coating composition of claim 4, where said liquid carrier is water.

13. The fluoropolymer coating composition of claim 5, where said liquid carrier is water.

14. A coated article which is obtained by coating, as a top coat, the fluoropolymer coating composition of claim 1 so as to form at least 30 µm thick molten coating film.

15. A coated article which is obtained by coating, as a top coat, the fluoropolymer coating composition of claim 3 so as to form at least 30 µm thick molten coating film.

16. A fluoropolymer coating composition of claim 2, wherein the surfactant includes a member represented by formula (I).

17. A fluoropolymer coating composition of claim 2, wherein the surfactant only includes a member represented by formula (I).

* * * * *